United States Patent [19]
Everaere et al.

[11] Patent Number: 5,906,952
[45] Date of Patent: May 25, 1999

[54] SINGLE LAYER ABSORBENT CABLE WRAP

[75] Inventors: Jacques Everaere, Meteren; Michael Delattre, Erquinghem/Lys, both of France; Christopher Wren, Dorset, United Kingdom

[73] Assignee: Nordlys S.A., Bailleul, France

[21] Appl. No.: 08/813,484

[22] Filed: Mar. 7, 1997

[51] Int. Cl.$^6$ ....................... D04H 1/00
[52] U.S. Cl. ............ 442/356; 442/268; 442/319; 442/359; 442/381; 442/394; 442/412; 428/219; 428/220; 428/913
[58] Field of Search .................. 428/219, 220, 428/913; 442/356, 359, 381, 394, 412, 268, 319

[56] References Cited

U.S. PATENT DOCUMENTS 5,413,747  5/1995  Akers et al. ..................... 264/211

*Primary Examiner*—Christopher Raimund
*Attorney, Agent, or Firm*—Amster, Rothstein & Ebenstein

[57] ABSTRACT

A water-absorbent wrap for power cables, communication cables, and like cables includes a calendered, single layer nonwoven formed of a carded mixture of super water-absorbent fibers and cohesive carrier fibers. The calendered nonwoven is characterized by a thickness of not more than 2.0 mm, a basis weight of not more than 200 gsm, a swelling height of at least 3 mm, a swelling speed of at least 1 mm/1st min., and a tensile strength of at least 20 N/5 cm.

18 Claims, 1 Drawing Sheet

SINGLE LAYER ABSORBENT CABLE WRAP

BACKGROUND OF THE INVENTION

The present invention relates to a material made with super-absorbent fibers which may be wrapped around a cable for the purpose of blocking water passage therethrough, and more particularly to such a material which is or includes a single layer nonwoven.

In recent years, a number of different moisture absorbent wrapping materials have been developed for the specific purpose of protecting power cables and telecommunication (telecom) cables against moisture. All of these wraps or tapes contain super-absorbent polymers which provides the water-blocking capacity. Such super-absorbing polymers are well known in a variety of different arts. The super-absorbent materials are preferably of acrylic, starch or cellulosic origin, although others may be used in place of or in conjunction therewith. In many instances, the absorbent wrap is a laminate formed of two or three layers of non-wovens or films (e.g., polyester) with one of these layers being made of a super-absorbent polymer, typically an intermediate layer with the super-absorbent polymer being in the form of a powder.

The known absorbent wraps have not proven to be entirely satisfactory. In particular, the conventional wraps are too thick for the smaller diameter cables (e.g., fiber optic cables of less than 12 mm O.D.), which preferably utilize a wrap having a thickness not in excess of two millimeters. The conventional wraps also pose a potential source of trouble during cable production due to "powdering" (that is, the loss of super-absorbent polymer powder from the laminate) and due to the limited peel strength of the laminates. Additionally, the swelling capacity of the super-absorbent polymers is limited due to the necessary cohesion of the various outer layers of the laminate.

The cable market, and especially the telecom cable market, requires ever thinner absorbent wraps, with ever improved absorbent properties (e.g., swelling speed and height) and with sufficient tensile strength and ease of handling for improved machineability on the various types of modern cable-manufacturing equipment.

Accordingly, it is an object of the present invention to provide a single layer nonwoven absorbent material having a thickness not more than 2 millimeters.

Another object is to provide such an absorbent material exhibiting a high swelling speed and height.

A further object is to provide such an absorbent material which, because it is a single layer nonwoven, is easy to handle on industrial cable-wrapping equipment.

It is also an object of the present invention to provide such an absorbent material having a high tensile strength enabling its use on conventional modern cable-wrapping equipment.

It is another object to provide a water-absorbent laminate made from such an absorbent material.

SUMMARY OF THE INVENTION

It has now been found that the above and related objects of the present invention are obtained in a water-absorbent wrap for power cables, communication cables, and like cables. The wrap comprises a calendered single layer nonwoven formed of a carded mixture of water-absorbent fibers and cohesive carrier fibers. The calendered nonwoven is characterized by:

(i) a thickness of not more than 2.0 mm,
(ii) a basis weight of not more than 200 gsm,
(iii) a swelling height of at least 3 mm and a swelling speed of at least 1 mm/1st min., and
(iv) a tensile strength of at least 20 N/5 cm.

In a preferred embodiment the calendered nonwoven is characterized by a thickness of 0.15–2.0 mm, a basis weight of 50–200 gsm, a swelling height of 3–16 mm, a swelling speed of 1–10 mm/1st min., and a tensile strength of at least 40 N/5 cm. The carrier fibers are polyester or acrylic, and are 30–70% (preferably 50%) by weight of the carded mixture.

The invention also encompasses a wrap comprising a composite laminate of the calendered single layer nonwoven and a substrate, the substrate being selected from the group consisting of paper, knits, wovens, nonwovens, films and combinations thereof. The wrap may additionally include a thermofusible coating between the calendered carded mixture and the substrate.

The invention also encompasses a wrap comprising a calendered composite laminate of the uncalendered single layer nonwoven (formed of a carded mixture of water-absorbent fibers and cohesive carrier fibers) and a substrate, the substrate being selected from the group consisting of paper, knits, wovens, nonwovens, films and combinations thereof. The wrap may additionally include a thermofusible coating between the carded mixture and the substrate.

In each case, the composite laminate is characterized by:

(i) a thickness of not more than 3.0 mm,
(ii) a basis weight of not more than 200 gsm,
(iii) a swelling height of at least 3 mm and a swelling speed of at least 1 mm/1st min., and
(iv) a tensile strength of at least 120 N/5 cm.

Preferably the composite laminate is characterized by a thickness of 0.15–2.5 mm, a basis weight of 50–200 gsm, a swelling height of 3–16 mm, a swelling speed of 1–10 mm/1st min., and a tensile strength of at least 140 N/5 cm.

The substrate is preferably selected from the group consisting of films, nonwovens, foams and combinations thereof.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
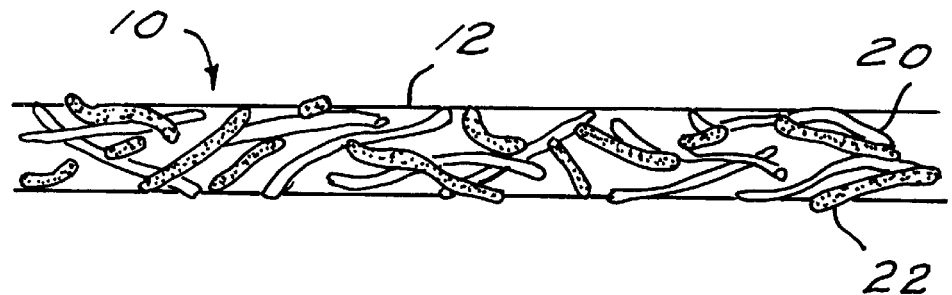
FIG. 1 is a schematic sectional view of a water-absorbent calendered single layer nonwoven according to the present invention.

Referring now to the drawing, and in particular to FIG. 1 thereof, therein illustrated is a water-absorbent wrap according to the present invention, generally designated by the reference numeral 10. The wrap is designed to preclude water penetration of power cables, communication cables and like cables. The wrap 10 is a calendered single layer nonwoven 12 formed of a carded mixture of water-absorbent fibers 20 and cohesive carrier fibers 22.

The wrap 10 formed of the calendered single layer nonwoven 12 is characterized by a thickness not greater than 2.0 millimeters (preferably a thickness of 0.15–2.0 mm), a basis weight not greater than 200 grams per square meter (gsm) (preferably a basis weight of 50–200 gsm), a swelling height of at least 3 millimeters (preferably a swelling height of 3–16 millimeters), a swelling speed of at least 1 millimeter/first minute (preferably a swelling speed of 1–10 mm/1st min.), and a tensile strength of at least 20 Newtons/5 centimeters (preferably a tensile strength of at least 40 N/5 cm).

Thickness is an important parameter for a cable maker. In fiber optic technology, producers are always looking for ways of increasing the number of optic fibres in a single cable without increasing the outer diameter of the cable. Thus, they are looking for ever thinner wrapping material. Non-conductive water-blocking tapes are currently in the range of 0.2–0.6 mm. For power cable, water blocking tapes may act as a cushion for the metallic electromagnetic shielding, in which case the required thickness may be as large as 2.0 mm. Thickness is measured with a caliper and evaluated in mm under International Standards Organization test ISO 9073-2.

Tensile strength is also important to a cable maker for processability of the wrap on conventional modern cable winding machinery. A wrapping material can be processed in two different ways. Helicoidal wrapping requires the highest tensile strength (minimum of 35 N/cm or 175 N/5 cm), while longitudinal wrapping allows a lower tensile strength (minimum of 20 N/cm or 100 N/5 cm). Tensile strength is measured with a tensile tester on 5 cm wide strips as N/5 cm under ISO 9073-3.

Basis weight (weight per unit area) is evaluated in grams per square meter under ISO 9073-1. Usual water-blocking products are in the range of 60–200 gsm.

Swelling height is the most common way of evaluating the swelling performance of a cable wrapping material. The method uses a polyamide cup (inner diameter: 80 mm), in which a perforated piston (weight: 90 g) can freely move vertically. The material to be evaluated is placed inside the cup and covered with the piston. Then, water is poured inside the cup, allowing the swelling of the material and the upward movement of the piston. The swelling height is recorded with a convenient sensor (e.g., a laser or mechanical device). The swelling height is generally evaluated after 10 minutes, with swelling speed measured as the height after the first minute. Depending on the type of cable, and their location inside a cable construction, wrapping materials offer a range of swelling height from 3 to 18 mm and a range of swelling speed from 1.5 to 4 mm/1st min. The upper limit on useful swelling height is, of course, determined by the available room in the cable construction for swelling. The demand is for ever increasing swelling speed.

The water-absorbent fibers 20 are preferably super-absorbent fibers which, as noted above, may be of from acrylic, starch or cellulosic origin. Preferred super-absorbent fibers are spun from an acrylic-based polymer or copolymer. Preferred super-absorbent fibers include cross-linked acrylate copolymer (partially neutralized to the sodium salt), olefin/alkyl carboxylate copolymer (partially neutralized to the sodium salt), and a bi-component sheath-core fiber having an outer layer made of cross-linked acrylate copolymer (partially neutralized to the ammonium salt), and an inner layer of polyacrylonitrile.

For example, the fiber may be a cross-linked acrylate copolymer, partially neutralized to the sodium salt (according to U.S. Pat. Nos. 5,413,747 and 5,466,731) and available in fiber form under the trade name OASIS from Technical Absorbents Limited of Grimsby, United Kingdom; or olefin/alkyl carboxylate co-polymer, partially neutralized to the sodium salt (according to E.P. 0 436 514 81) and available in fiber form under the trade name CAMELOT from Camelot Super Absorbents Ltd. of Calgary, Canada); or a bi-component fiber of the sheath-core type with the outer layer being made of cross-linked acrylate copolymer, partially neutralized to the ammonium salt (according to U.S. Pat. No. 4,562,114) and available under the trade name LANSEAL F from Japan Exlan Co., Ltd. of Osaka, Japan) and the inner layer being made of polyacrylonitrile.

The super-absorbent fibers 20 provide the wrap 10 with its absorbent capacity and, to a lesser degree, its bonding capacity. The super-absorbent fibers are preferably less than 10 denier (optimally 3–10 denier) with a cut length of 30–65 millimeters (optimally 50 mm). Denier is the unit weight of a fiber expressed as the weight in grams of a 9,000 meter length.

The super-absorbent fibers 20 appear as little rods and have either no crimp or a very low level of crimp. Accordingly, a web made entirely of such super-absorbent fibers has no cohesion; indeed, such fibers cannot be carded. Further, such super-absorbent fibers are easily breakable during any mechanical processing. While these properties of super-absorbent fibers are acceptable in a conventional wrap which is a laminate of several layers, with an intermediate layer of super-absorbent polymer powder, they present problems for a single layer nonwoven wrap. Accordingly, it is necessary to blend the super-absorbent fibers 20 with cohesive carrier fibers 22 as described below. The cohesive carrier fibers 22 enable the carding of the super-absorbent fibers 20 by inducing a certain level of cohesion into the web made of the two fiber types through fiber entanglement.

The physical characteristics of the carrier fibers 22 naturally influence the cohesiveness of the resultant web. The cohesiveness of the web (that is, the shear strength of one fiber acting against another fiber in the web) is reflected in the tensile strength (and hence processability) of the wrap. Thus, the carrier fibers should have a minimum level of crimp. The level of crimp can be defined as the number of waves or crimps per centimeter, as observed under a microscope or magnifying glass, and the carrier fibers must have a minimum of ten waves per centimeter. The carrier fibers should be of low denier (that is, very fine) in order to increase the number of fibers per unit area for a product of a given weight and to increase the entanglement level of the fibers. The carrier fibers are preferably about 1.5 denier, although a denier as high as 6.0 may be used. The carrier fibers preferably have lengths of 30–70 millimeters, with 50 mm being referred.

A wide variety of different carrier fibers 22 may be used, including polyester, polyacrylonitrile, polyamide, polyvinyl alcohol, cellulose (rayon) and the like. The carrier fibers may also be bi-component fiber made of polyester-polyester or polyester-polyolefin. Preferred carrier fibers are cellulosic or thermoplastic in nature, with the most preferred fibers for cable wrapping being polyester or acrylic fibers. It has been found that, depending upon the chemical nature of the carrier fiber 22, it may affect the absorbent capacity of the super-absorbent fiber 20 either positively or negatively.

Many of the useful carrier fibers 22 are thermofusible, just as many of the useful super-absorbent fibers 20 are thermoplastic, thus enabling their use as thermobonding fibers. The thermobonding capacity of the suitable super-absorbent fibers and carrier fibers can be used to enhance the bonding of the fibers in the nonwoven. It has been found that it is strongly preferred to utilize the thermobonding capacity of the super-absorbent fibers rather than the thermobonding capacity of the carrier fibers so that, during swelling of the nonwoven, water is able to break the bonds between the super-absorbent fibers and thereby allow a full swelling of the nonwoven (even when the water is not able to break the bonds between the carrier fibers). Unfortunately, thermobonding of the super-absorbent fibers confers to the nonwoven a limited tensile strength so that lamination to form a composite, as described hereinafter, may be necessary to obtain the required level of tensile strength.

As will be apparent to those skilled in the art, particular characteristics can be conferred to the nonwoven by using specific carrier fibers such as flame-retardant polyester fibers or electrically conductive fibers.

The single layer nonwoven 12 is preferably a blend or carded mixture of 30–70% super-absorbent fibers 20 and 70-30% cohesive carrier fibers 22, preferably 45–55%/55-45%, and optimally 50—50% by weight. Increasing the proportion of carrier fibers 22 in the nonwoven 12 improves the cohesion of the carded mixture, but reduces the swelling capacity thereof for a given basis weight. Increasing the proportion of super-absorbent fibers 20 in the nonwoven 12 enhances the swelling (absorbent) properties of the wrap for a given basis weight, but reduces the cohesion of the carded mixture and nonwoven.

The nonwoven 12 produced by the carding is then bonded via calendering to provide increased cohesiveness—e.g., by passing through a three-roll calender for smooth calendering. In such a three-roll calender, the bottom roll is a smooth paper roll, the middle roll is an oil-heated, chromium-plated steel roll, and the top roll is a smooth paper roll. Different travel paths through the three-roll calender affect the technical characteristics of the nonwoven. Typically, the calender will have a pressure range of 20–180 daN/cm and a maximum temperature of about 250° C. on the surface of the steel roll. The product leaving the calender has sufficient cohesiveness to be wound on a standard nonwoven winding unit.

Thus, the absorbent wrap 10 is produced in two steps. First, a web of fibers is produced from a blend of super-absorbent fibers 20 and carrier fibers 22 by mechanical carding. The initial opening and blending of the super-absorbent and carrier fibers may be effected by conventional state-of-the-art fiber-opening and blending equipment (e.g., an opening and blending range using toothed roller available from Hergeth-Hollingsworth of Dulmen, Germany, Trutzshler of Germany, and other companies), with the web then being carded by a roller top worker stripper card for nonwovens or like carding equipment. Second, the web of fibers forming the carded mixture is then calendered (either by itself or in combination with a substrate). Because of the unique combination of high absorption capacity, high tensile strength, low thickness and low basis weight, the resultant product can be used to provide the wrapping of elements in a number of different cable constructions for the purpose of water blocking.

Figure 2:
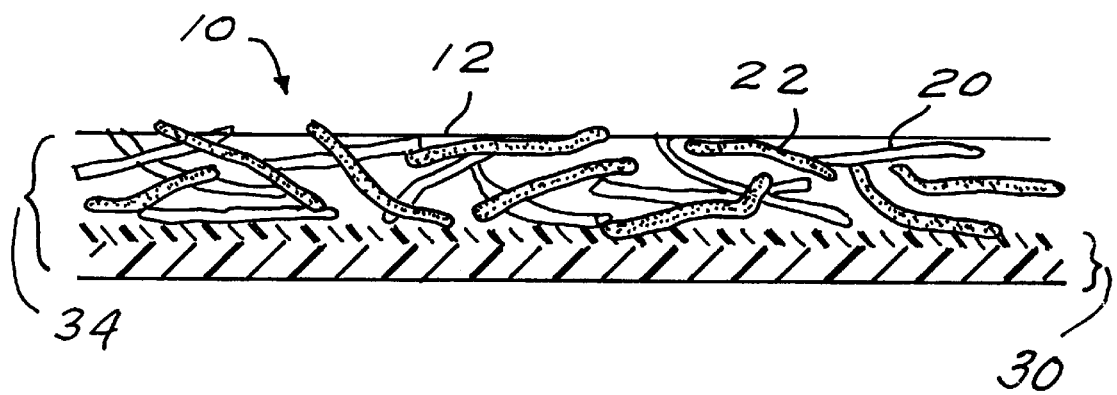
FIG. 2 is a schematic sectional view of a composite laminate (made from the calendered nonwoven and a substrate) according to the present invention.
Figure 3:
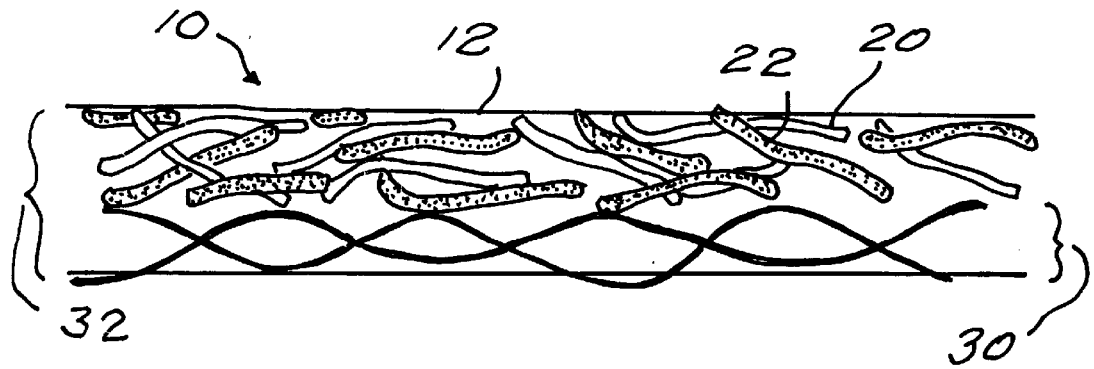
FIG. 3 is a schematic sectional view of a calendered composite laminate (made from an uncalendered nonwoven and a substrate) according to the present invention.

Referring now to FIGS. 2 and 3 in particular, the properties of the nonwoven 12—that is, the carded mixture of the super-absorbent fibers 20 and the carrier fibers 22—can be improved with an eye towards specific characteristics by lamination of a calendered or uncalendered single layer nonwoven 12 onto a substrate 30 to form a wrap 10. The substrate 30 may be a film (e.g., polyester films for fiber optic cable), nonwoven (e.g., carded, spunbonded, or otherwise formed and, e.g., polyesters, polyolefins, blends and other compositions), paper, woven or knitted fabric, foam and combinations thereof. Preferably the substrate 30 is a film, nonwoven, foam or combination thereof. As will be readily apparent to those skilled in the art, particular substrates can improve the properties of the laminate by modifying the thickness, tensile strength, tear strength, electroconductivity, and even waterproofing (by laminating a waterproof film onto one side of the nonwoven).

The substrate may be laminated to the nonwoven either directly or using well known lamination technologies. Thus, referring now to FIG. 3, the substrate may be directly laminated during calendering of the nonwoven, for example, using the thermobonding capabilities of nonwovens made from thermofusible fibers. In other words, the uncalendered nonwoven and the substrate are laminated together by calendering to form a calendered composite laminate, generally designated 32, as illustrated in FIG. 3. (This process requires a good balance between the fusing temperatures of the various components.) Alternatively, referring now to FIG. 2, the well known lamination technologies, like sinter coating or fiberization of fusible polymer (e.g., polyethylene, ethylvinyl acetate, polyethylene terephthalate (PET), and polyacrylate), may be employed to form a composite laminate, generally designated 34, of the calendered nonwoven and the substrate. The composite laminate is typically, but not necessarily, calendered, as illustrated in FIG. 2.

Thus, the nonwoven 12 may be passed through a calender for smooth calendering and use by itself (see Example 1). Alternatively, the nonwoven 12 may be calendered by itself to obtain a thin material with good swelling properties and low tensile strength, and then, in a second step, the calendered nonwoven may be laminated onto a substrate (such as a film, nonwoven or foam) to get a composite laminate 34 exhibiting the desired level of performance in terms of thickness and tensile strength (see Example 2). Alternatively, the uncalendered nonwoven 12 may be laminated by calendering onto a substrate (for example, a spunbonded PET nonwoven, as in Example 3), thereby to produce in a single step any of a range of calendered composite laminate products 32 suitable for longitudinal wrapping of fiber optic cable.

The composite laminate 32, 34 is characterized by a thickness not greater than 3.0 millimeters (preferably a thickness of 0.15–2.5 mm), a basis weight not greater than 200 grams per square meter (gsm) (preferably a basis weight of 50–200 gsm), a swelling height of at least 3 millimeters (preferably a swelling height of 3–16 millimeters), a swelling speed of at least 1 millimeter/first minute (preferably a swelling speed of 1–10 mm/1st min.), and a tensile strength of at least 120 Newtons/5 centimeters (preferably a tensile strength of at least 140 N/5 cm).

The following examples illustrate the efficacy of the present invention.

EXAMPLE 1

A nonwoven was prepared, using a laboratory card, from equal amounts of OASIS crosslinked acrylate copolymer, partially neutralized to the sodium salt, in fiber form, and acrylic fiber (1.5 denier, 37 mm in length) from Courtlands Ltd. of the United Kingdom.

The nonwoven was then calendered at 212° C., a pressure of 168 daN/cm and a speed of 13.6 meters/min. to form the end product.

EXAMPLE 2

The end product of Example 1 (i.e., the calendered nonwoven) was laminated onto a polyethylene-terephthalate [PET] film (23 microns in thickness) from duPont coated with a layer of polyethylene by Assi Dolmain of Duffel, Belgium. The polyethylene coating of the PET serves as a thermofusible coating between the calendered nonwoven and the PET film.

The lamination of the composite was effected by a light calendering of the composite (relative to the relatively heavy calendering of the nonwoven) at 130° C., a pressure of 20 daN/cm and a speed of 7 meters/min. to form the end product by thermofusing.

EXAMPLE 3

A nonwoven was prepared, using a laboratory card, from equal amounts of OASIS cross-linked acrylate copolymer, partially neutralized to the sodium salt, in fiber form and PET T54W fiber (1.5 denier, 38 mm in length) from duPont. The nonwoven weight was 64 gsm.

The uncalendered nonwoven was then laminated directly onto a PET spunbonded nonwoven available under the trade name REEMAY 2214 from Reemay of U.S.A. The lamination of the composite was effected by relatively heavy calendering of the composite at 223° C. a pressure of 147 daN/cm and a speed of 7 meters/min. to form the end product.

The characteristics of the end products of the various examples are set forth in the Table below.

TABLE

| Example | Basis Weight, gsm | Thickness, mm | Tensile Strength, N/5 cm | Swelling Speed, mm | Height, mm |
|---|---|---|---|---|---|
| 1 | 65 | 0.12 | 27.6 | 6.0 | 7.0 |
| 2 | 107 | 0.19 | 220 | 6.0 | 6.0 |
| 3 | 110 | 0.22 | 144 | 3.6 | 3.6 |

It will be appreciated that the calendered nonwoven by itself (see Example 1) possesses only minimal tensile strength, enough to enable it to be wound up on a roll, but not enough to enable its use in a wide variety of cable wrapping. Albeit with some increase in basis weight and thickness, the composite laminates (see Examples 2 and 3) afford a greatly enhanced level of cohesiveness (that is, tensile strength).

It will also be appreciated that the direct lamination of the uncalendered nonwoven onto a substrate (see Example 3) results in inferior swelling properties relative to the calendered nonwoven itself (see Example 1) or the composite laminate made with the calendered nonwoven (see Example 2).

To summarize, the present invention provides a single layer nonwoven absorbent material having a thickness not more than 2 millimeters. The absorbent material exhibits a high swelling speed and height, a high tensile strength enabling its use on conventional modern cable wrapping equipment, and easy handling on industrial cable-wrapping equipment (because it is a single layer nonwoven). The present invention also provides a water-absorbent laminate or composite wrap made from such an absorbent material.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A water-absorbent wrap for power cables, communication cables, and like cables, comprising:
   a calendered single layer nonwoven formed of a carded mixture of water-absorbent fibers and cohesive carrier fibers, said calendered nonwoven being characterized by:
   (i) a thickness of not more than 2.0 mm,
   (ii) a basis weight of not more than 200 gsm,
   (iii) a swelling height of at least 3 mm and a swelling speed of at least 1 mm/1st min.,
   (iv) a tensile strength of at least 20 N/5 cm; and
   said carrier fibers being characterized by:
   (i) at least 10 crimps per cm., and
   (ii) a denier not exceeding 6.

2. The wrap of claim 1 wherein said calendered nonwoven is characterized by:
   (i) a thickness of 0.15–2.0 mm,
   (ii) a basis weight of 50–200 gsm,
   (iii) a swelling height of 3–16 mm and a swelling speed of 1–10 mm/1st min., and
   (iv) a tensile strength of at least 40 N/5 cm.

3. The wrap of claim 1 wherein said carrier fibers are polyester or acrylic.

4. The wrap of claim 1 wherein said carrier fibers are 30–70% by weight of said carded mixture.

5. The wrap of claim 1 wherein said carrier fibers are 50% by weight of said carded mixture.

6. A water-absorbent wrap for power cables, communication cables, and like cables, comprising a composite laminate of
   (A) a calendered single layer nonwoven of a carded mixture of water-absorbent fibers and cohesive carrier fibers, and
   (B) a substrate selected from the group consisting of paper, knits, wovens, nonwovens, films and combinations thereof;
   said composite laminate being characterized by:
   (i) a thickness of not more than 3.0 mm,
   (ii) a basis weight of not more than 200 gsm,
   (iii) a swelling height of at least 3 mm and a swelling speed of at least 1 mm/1st min.,
   (iv) a tensile strength of at least 120 N/5 cm; and
   said carrier fibers being characterized by:
   (i) at least 10 crimps per cm., and
   (ii) a denier not exceeding 6.

7. The wrap of claim 6 wherein said composite laminate is characterized by:
   (i) a thickness of 0.15–2.5 mm,
   (ii) a basis weight of 50–200 gsm,
   (iii) a swelling height of 3–16 mm and a swelling speed of 1–10 mm/1st min., and
   (iv) a tensile strength of at least 140 N/5 cm.

8. The wrap of claim 6 wherein said carrier fibers are polyester or acrylic.

9. The wrap of claim 6 wherein said carrier fibers are 30–70% by weight of said carded mixture.

10. The wrap of claim 6 wherein said carrier fibers are 50% by weight of said carded mixture.

11. The wrap of claim 6 additionally including a thermofusible coating between said carded mixture and said substrate.

12. A water-absorbent wrap for power cables, communication cables, and like cables, comprising a calendered composite laminate having:
   (A) an uncalendered single layer nonwoven formed of a carded mixture of water-absorbent fibers and cohesive carrier fibers, and
   (B) a substrate selected from the group consisting of paper, knits, wovens, nonwovens, films and combinations thereof;
   said calendered composite laminate being characterized by:
      (i) a thickness of not more than 3.0 mm,
      (ii) a basis weight of not more than 200 gsm,
      (iii) a swelling height of at least 3 mm and a swelling speed of at least 1 mm/1st min.
      (iv) a tensile strength of at least 120 N/5 cm; and
   said carrier fibers being characterized by:
      (i) at least 10 crimps per cm., and
      (ii) a denier not exceeding 6.

13. The wrap of claim 12 wherein said calendered composite laminate is characterized by:
   (i) a thickness of 0.15–2.5 mm,
   (ii) a basis weight of 50–200 gsm,
   (iii) a swelling height of 3–16 mm and a swelling speed of 1–10 mm/1st min., and
   (iv) a tensile strength of at least 140 N/5 cm.

14. The wrap of claim 12 wherein said carrier fibers are polyester or acrylic.

15. The wrap of claim 12 wherein said carrier fibers are 30–70% by weight of said carded mixture.

16. The wrap of claim 12 wherein said carrier fibers are 50% by weight of said carded mixture.

17. The wrap of claim 12 additionally including a thermofusible coating between said carded mixture and said substrate.

18. A composite laminate comprising a lamination of the wrap of claim 1 and a substrate, said substrate being selected from the group consisting of films, nonwovens, foams and combinations thereof.

* * * * *